UNITED STATES PATENT OFFICE.

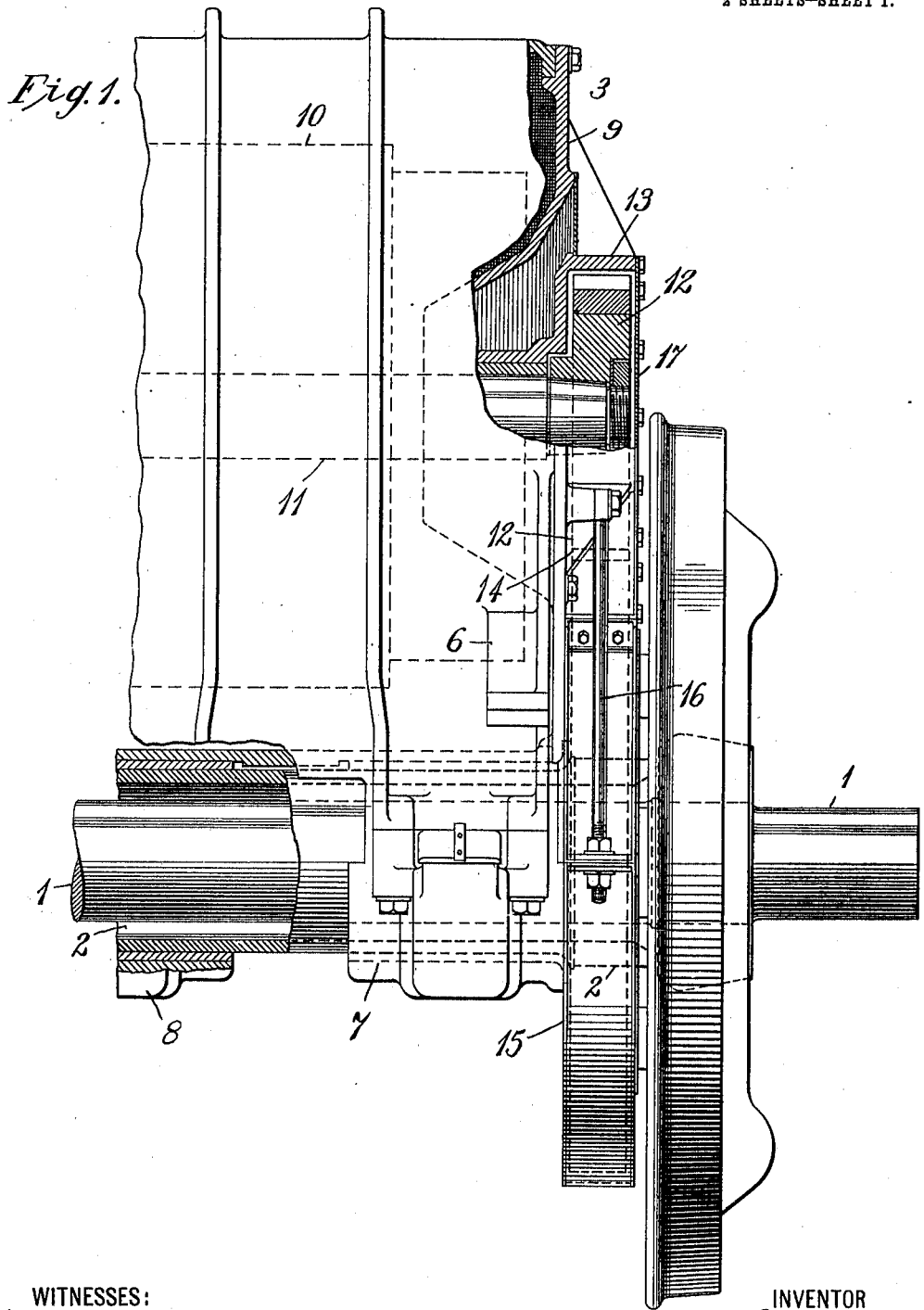

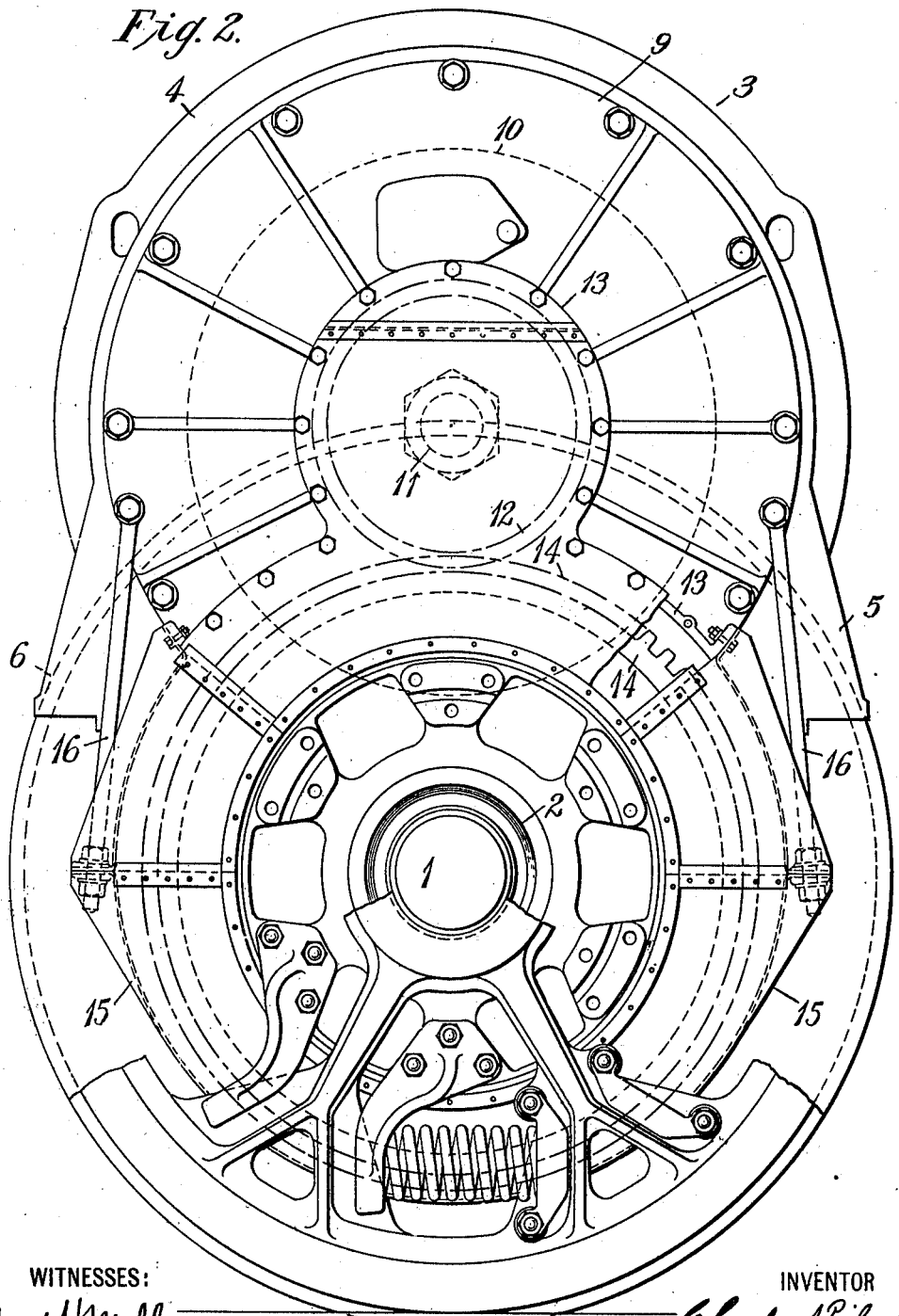

CHARLES A. PSILANDER, OF WILKINSBURG, PENNSYLVANIA, ASSIGNOR TO WESTINGHOUSE ELECTRIC AND MANUFACTURING COMPANY, A CORPORATION OF PENNSYLVANIA.

VEHICLE-MOTOR.

993,619.            Specification of Letters Patent.      Patented May 30, 1911.

Application filed December 2, 1909. Serial No. 531,066.

*To all whom it may concern:*

Be it known that I, CHARLES A. PSILANDER, a citizen of the United States, and a resident of Wilkinsburg, in the county of Allegheny and State of Pennsylvania, have invented a new and useful Improvement in Vehicle-Motors, of which the following is a specification.

My invention relates to electric driving motors for railway vehicles and particularly to the frame structures of such motors as are employed for driving electrically operated locomotives.

The object of my invention is to provide a special end frame structure for a motor of the class indicated above which shall constitute a bearing housing for the rotating part of the machine and a casing for the driving gears in order to make the most economical use of the space between the locomotive drivers.

It has been proposed for electric locomotives which are intended for hauling freight trains or other trains of great weight to mount a large and powerful driving motor directly above each of the locomotive driving axles and to establish a driving connection by mounting a relatively large gear wheel on the axle close to the wheel, a driving pinion therefor being secured to the motor shaft which is directly above. This arrangement is advantageous because it permits of the use of large motors with smaller drivers than is possible with a concentric arrangement of mounting the motor on the axle, and, furthermore, the height of the center of gravity of the locomotive above the track is increased, and the wear and tear on the road bed is diminished.

According to my present invention, I provide end frame structures for driving motors which are adapted to be mounted as above indicated and which constitute bearing housings for the rotating part of the motor without interfering with the end connecting operations of the armature winding and which also constitute a part of the gear casing in which the driving pinions and the gear wheels are located.

It is evident that my proposed structure is applicable to motors of any size and type and that the arrangement illustrated may be adapted to vehicles which are intended for various purposes and classes of service.

Figure 1 of the accompanying drawings is a partially sectional elevation of a portion of an electric driving motor constructed in accordance with my invention, a portion of the driving axle with which it is associated being also disclosed. Fig. 2 is an end elevation of the parts shown in Fig. 1 with a portion of the driving wheel removed.

Referring to the drawings, the structure here shown comprises a driving axle 1 of a locomotive or other railway vehicle, a quill 2, which surrounds the axle, and a driving motor 3 which is mounted directly above the axle 1, as hereinafter described. The motor 3 comprises a stationary field magnet frame 4 having supporting brackets 5 and 6 which are intended to rest on the truck girders (not shown); bearing housings 7 and 8, which are divided horizontally and in which the quill 2 is supported, and end frames 9 (only one of which is shown) that constitute bearing housings for the armature 10 of the motor, in the usual manner. The armature shaft 11 is substantially parallel to the center line of the axle 1 and is provided with driving pinions 12 upon its respective ends. Each of the end frames is provided with a flange 13 which forms a shallow cylindrical box or casing to receive the pinion 12 and a portion of a similar casing for the gear wheel 14 which is mounted on the quill 2 and is adapted to mesh with the pinion 12. The casing for the gear wheel is completed by a removable structure 15 that is supported upon the end frame by means of bolts 16.

Since the quill 2 upon which the gear wheels are mounted is rotatably supported in the bearing housings 7 and 8 which form a part of the field magnet frame of the motor, and, since the pinions 12 are secured to the motor shaft, which is also directly supported by the field magnet frame, the alinement of the gears is readily maintained. The gear wheels 14 are connected to the locomotive drivers by any suitable resilient driving connection such as that shown and described in Patent No. 937,346, granted October 19, 1909, to the Westinghouse Electric & Manufacturing Company upon an application filed by John E. Webster.

The relative diameters of the axle and the quill are such as to permit of considerable movement between them, and, since the weight of the motor is borne by the truck frame and not by the axle, it is evident that the track and the road bed will be free from the shocks which they would otherwise receive when the locomotive is operating at high speeds. The pinion 12 and the gear wheel 14 are completely inclosed by means of a sheet metal cover 17 which is bolted to the flange 13 and to the structure 15.

With the arrangement shown, it is possible to employ two sets of gears in parallel, one set at each end of the motor and, consequently, large power may be transmitted from the motor to the axle and, at the same time, the space occupied by the gears is reduced to a minimum. The resilient connection between the drivers and the gear wheels not only permits a vertical adjustment between the motor shaft and the driving axle, but also absorbs the irregularities in the torque of the motor when it is operated by alternating current energy.

It is evident that structural modifications may be effected without departing from the spirit of my invention.

I claim as my invention:

1. In a railway vehicle, the combination with a driven axle and an electric driving motor having a field frame, an end frame therefor having an inwardly projecting bearing housing and provided with an outwardly extending flange projection, of a driving gear connection between the motor and the axle, comprising a pinion which is protected by the flange projection of the end frame and is substantially flush with the outer surface of the end frame, and a gear wheel which is partially protected by the said flange.

2. In a railway vehicle, the combination with a driven axle and an electric driving motor having a rotatable armature, a stationary field frame and an end frame provided with an inwardly extending central projection constituting a bearing housing for said armature and provided with an outwardly extending flange projection, of a gear wheel connected to the driven axle and a coöperating pinion secured to the armature shaft, and protected by the flange of the end frame.

In testimony whereof, I have hereunto subscribed my name this 26th day of November, 1909.

CHARLES A. PSILANDER.

Witnesses:
EDWIN TIDLUND,
B. B. HINES.

---

Copies of this patent may be obtained for five cents each, by addressing the "Commissioner of Patents, Washington, D. C."